United States Patent
Carberry et al.

(12) 
(10) Patent No.: US 6,430,335 B1
(45) Date of Patent: Aug. 6, 2002

(54) NETWORK HEALING SMART FIBER OPTIC SWITCH

(75) Inventors: John Carberry, Talbott; Michael L. Smith, Jefferson City, both of TN (US); Richard Racinskas, Coppell, TX (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 14 days.

(21) Appl. No.: 09/649,455

(22) Filed: Aug. 25, 2000

(51) Int. Cl.[7] .............................. G02B 6/26; G02B 6/92
(52) U.S. Cl. .............................. 385/20; 385/21; 385/16
(58) Field of Search .............................. 385/16, 17, 20, 385/22, 23, 24, 21; 359/117

(56) References Cited

U.S. PATENT DOCUMENTS 5,710,846 A * 1/1998 Wayman et al. .............. 385/17
5,726,788 A * 3/1998 Fee et al. .................... 359/163

* cited by examiner

Primary Examiner—Cassandra Spyrou
Assistant Examiner—Alessandro V. Amari
(74) Attorney, Agent, or Firm—Pitts & Brittian, P.C.

(57) ABSTRACT

A network healing smart fiber optic switch for fast, automatic switching between multiple paths of an optical transmission line with minimal disruption. The network healing smart fiber optic switch accepts multiple fiber optic inputs and splits each optical signal into primary and secondary signals. The primary optical signals go to an optical switch, which selects the primary optical signal to send to the output based on a control signal from a controller. The secondary optical signals go to the controller, and based on the relative signal strength of the secondary optical signals, the controller outputs a control signal to the optical switch. The controller is in communication with a remote computer or another controller and the controller's output signal to the optical switch can be overridden by the remote computer or other controller. The network healing smart fiber optic switch automatically senses the condition, including faults, on fiber optic cables and switches between fiber optic cables. The switching occurs automatically and quickly with minimal disruption to the transmitted signal.

3 Claims, 3 Drawing Sheets

NETWORK HEALING SMART FIBER OPTIC SWITCH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to optical fiber switches for switching optical transmission paths. More particularly, this invention pertains to a fiber optic switch which can switch between incoming optical transmission paths based upon the quality or condition of the signal being transmitted.

2. Description of the Related Art

Optical fibers are commonly used for the transmission of all types of data, including telecommunications, video, and computer data. Fiber optic cables have become an alternative to conventional wire transmission. The advantages of fiber optic cables over wire include greater bandwidth over greater distances with less loss and less cost. Fiber optic cables are considerably less susceptible than metal conductors to unauthorized "taps" and eliminate R.F. problems and the need for electrical isolation interfaces such as opto-isolators. Because of these advantages, fiber optic cables often are used as an alternative to wire in networks.

Typically, fiber optic cables are used to form a transmission line from an origination point to a destination point. Because of the great bandwidth of optical fiber, many times the fiber optic cable transmits in both directions, so that the origination point for one direction is also the destination point. Depending upon the length of the transmission line, lengths of fiber optic cable may have to be spliced, and the optical signal may have to be amplified in order to maintain the signal strength at the destination point. Along the transmission line, taps and routers may be used so that either portions of or all of the optical signal can be delivered to multiple destinations. Because of their widespread use, fiber optic networks oftentimes have complex topologies and numerous components, and accordingly, are subject to various faults. These faults may develop over a period of time and be evidenced by a slow degradation of signal quality and strength, as in dirt and grime accumulating at connection points and obstructing the cable's optical interface. Other faults may be catastrophic and occur suddenly, as in a cable being cut by an outside force or by failure of an upstream device.

There is a need to provide fast, intelligent fault recovery when a fiber optic cable no longer carries a signal. Fault recovery needs to occur with little delay because with a great bandwidth, long out-of-service times result in the loss of a great amount of data and information.

Therefore, it is an object of the present invention to provide a means for automatically switching between fiber optic cables.

It is a further object of the present invention to sense conditions on multiple fiber optic cables and perform the switching based on the sensed condition.

It is a still further object of the present invention to provide rapid switching such that minimum disruption occurs.

Another object of the present invention is to provide a means for preventing the switch from switching too frequently or oscillating between optical signal inputs.

Still another object of the present invention is to provide for remote control and monitoring of the switching.

BRIEF SUMMARY OF THE INVENTION

According to a preferred embodiment of the present invention, a network healing smart fiber optic switch assembly is disclosed comprising an optical switch responding to a controller which monitors multiple paths of an optical transmission line. Each fiber optic input is split into two signal paths, one a primary path and containing a majority of the signal strength and the other a secondary path for sensing. Each primary path goes to the optical switch and each secondary path goes to the controller, which senses the quality or condition of each fiber optic input. A fault on the primary fiber optic cable causes the network healing smart fiber optic switch to switch to another fiber optic cable within a selected amount of time and preferably within 10 milliseconds. Faults on a fiber optic cable are defined as a degradation of signal strength below a threshold level or the complete loss of the optical signal. The network healing smart fiber optic switch is also controlled locally and remotely via a buss connection with another computer or controller.

BRIEF DESCRIPTION OF THE SEVERAL VIEWS OF THE DRAWINGS

The above-mentioned features of the invention will become more clearly understood from the following detailed description of the invention read together with the drawing in which.

DETAILED DESCRIPTION OF THE INVENTION

Figure 1:
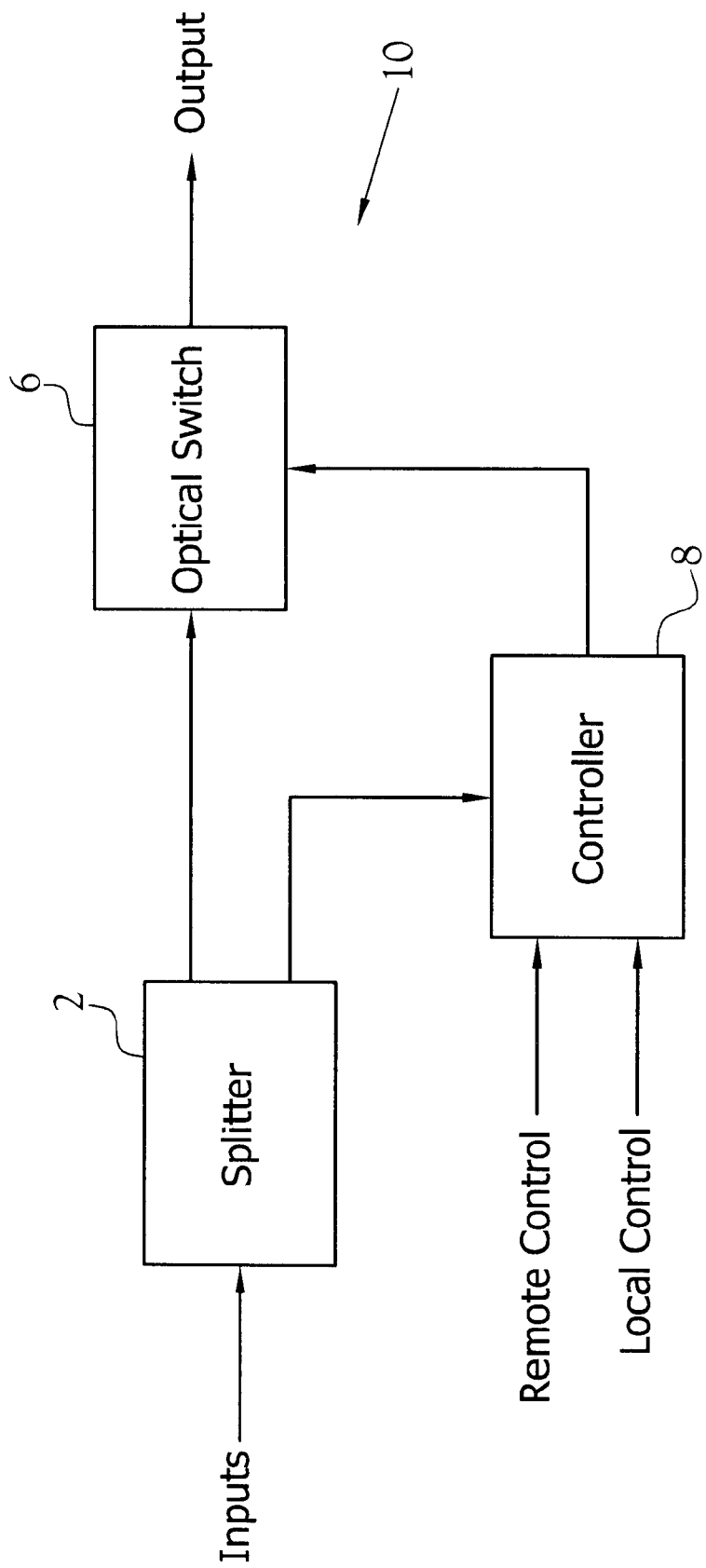
FIG. 1 illustrates a flow diagram of the network healing smart fiber optic switch.

Referring to FIG. 1, a flow diagram of the network healing smart fiber optic switch 10 has a plurality of inputs feeding a splitter 2. Each input is split into two signals, one going to the optical switch 6 and the other going to the controller 8. The controller 8 senses the condition of the signals from the splitter, and based on the sensed condition, which can be optionally overridden by either local or remote control, the controller 8 sends a control signal to the optical switch 6. The optical switch 6 switches the signals from the splitter to the output, based on the control signal from the controller 8.

Figure 2:
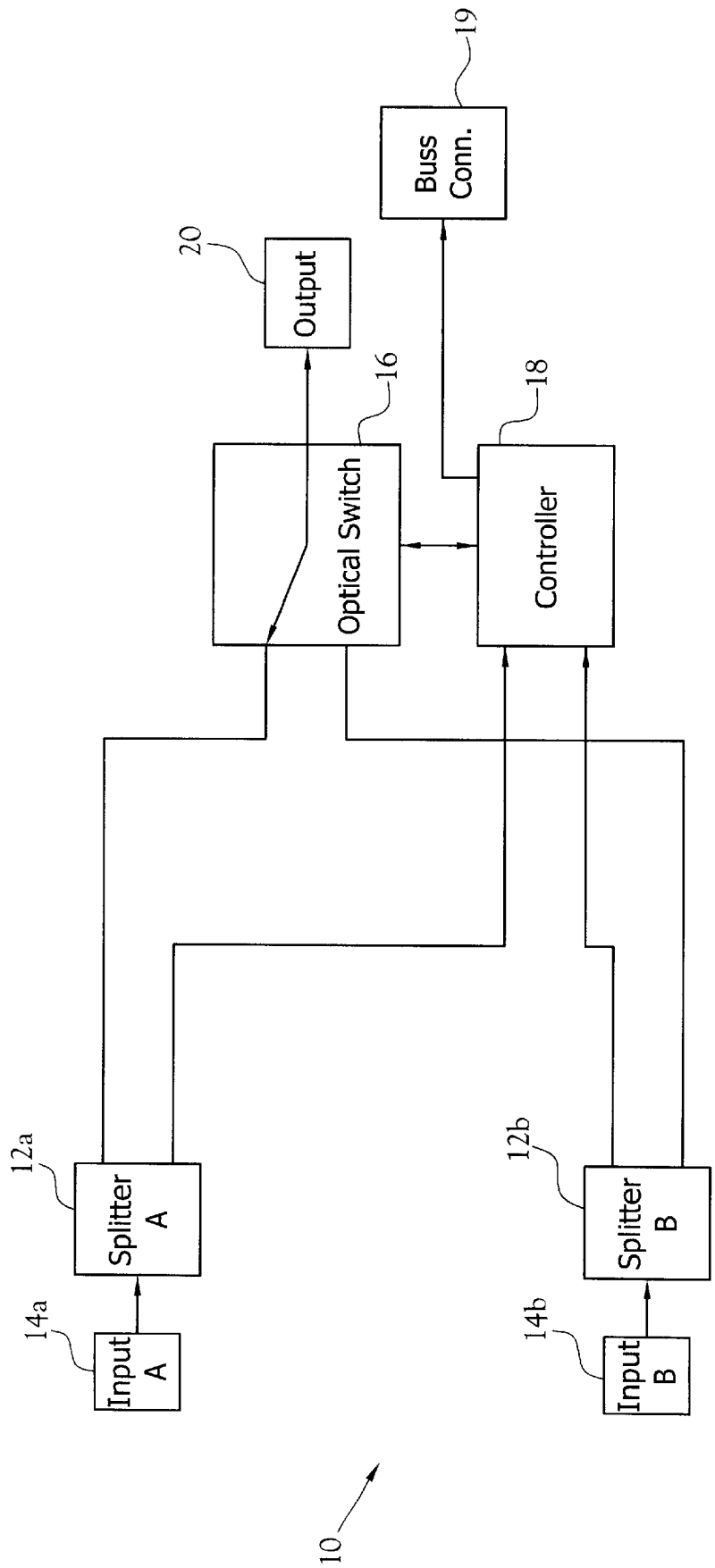
FIG. 2 illustrates a block diagram of the preferred embodiment of the network healing smart fiber optic switch.

In the preferred embodiment, which is shown in FIG. 2, the network healing smart fiber optic switch 10 has two fiber optic inputs representing two paths of an optical transmission line, one of which is passed through to the output. A fiber optic cable is connected to input A 14a. The optical signal from input A 14a is divided into two paths by splitter A 12a. The primary path, which consists of approximately 95% of the optical signal strength, goes to the optical switch 16. The secondary path, corresponding to approximately 5% of the optical signal strength, goes to the controller 18. Those skilled in the art will recognize that the division of the signal between the primary and secondary paths is not critical, and that if less than 95% signal strength is used for the primary path because the controller 18 sensing means requires more than 5% of the signal strength, the primary path signal strength can be increased by amplification at any point in its path. A second fiber optic cable is connected to input B 14b and is processed in a manner similar to the first fiber optic cable.

The optical switch 16 accepts inputs from splitter A 12a and splitter B 12b. The optical switch 16 is responsive to a control signal from the controller 18. The control signal causes the optical switch 16 to select and pass through to the output 20 one of the two inputs from splitter A 12a or splitter B 12b. The optical switch 16 is capable of switching between inputs within a short period.

The controller 18 senses the optical signals from splitter A 12a and splitter B 12b and has logic which determines which optical signal has the greatest optical signal strength. The controller 18 is responsive to local control which serves to override the controller 18 output. Also, the controller 18 is responsive to a buss connection 19, which puts the controller 18 into communication with a remote computer or other device and serves to provide control instructions to the controller 18. The controller 18 outputs a control signal to the optical switch 16 which causes the optical switch 16 to select and pass through to the output 20 one of the two inputs from splitter A 12a or splitter B 12b.

In the preferred embodiment, the controller 18 includes a photodiode, which senses the signal level from each fiber optic cable input. The controller 18 also includes logic which determines if the fiber optic signal passing through to the output has an optical signal strength, as sensed by the photodiode, which has fallen below a specified threshold value. If it has, the controller 18 causes the optical switch 16 to switch to the signal from another fiber optic cable. The optical switch 16 completes the switchover within a specified period, preferably within 10 milliseconds or less, effectively bypassing the fault, whether caused by a gradual signal degradation or equipment failure, with minimal disruption to the transmitted signal. After causing the optical switch 16 to operate, the controller 18 will inhibit further switching action for a specified period, effectively preventing rapid oscillation between the input signals. Those skilled in the art will recognize that other means for sensing the optical inputs and parameters other than signal strength may be used without interfering with the objects and advantages of the present invention. An alternative embodiment of the controller 18 includes logic which compares the primary fiber optic cable's optical signal strength to that of the other fiber optic cable's optical signal strength, and causes the optical switch 16 to switch to the fiber optic cable which has the greater signal strength.

Figure 3:
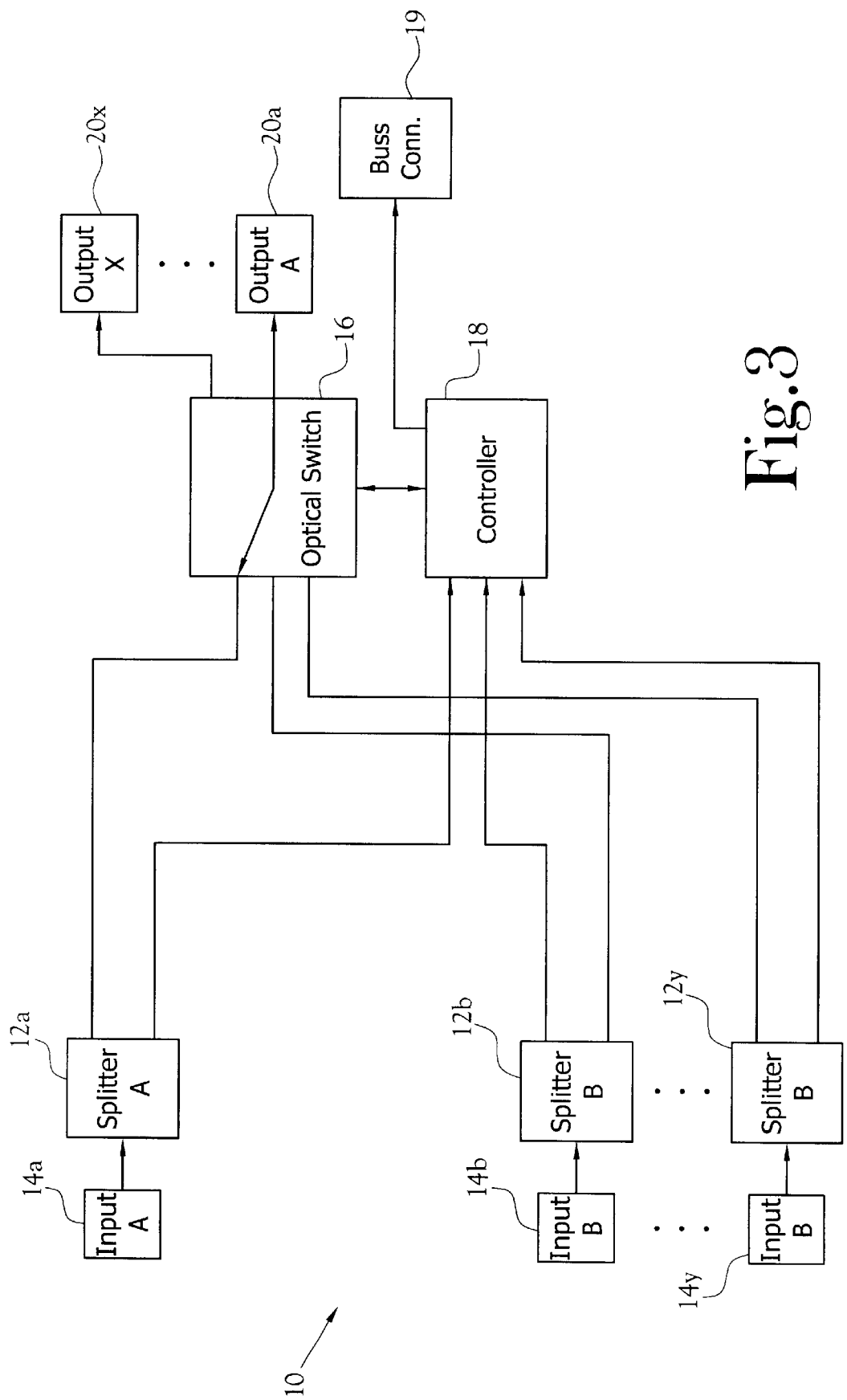
FIG. 3 illustrates a block diagram of the network healing smart fiber optic switch with multiple inputs and multiple outputs.

Referring to FIG. 3, another embodiment of the network healing smart fiber optic switch 10 is shown as having multiple inputs (14a through 14y) and multiple outputs (20a through 20x). The controller 18 causes the optical switch 16 to switch any input to any output, based on the logic of the controller 18, the sensed condition of the inputs, and any overriding signal from a local controller or remote source communicating through the buss connection 19. As in the preferred embodiment described above, the condition sensed is a fault condition as determined by the signal strength of an input degrading below a threshold value. An alternative embodiment of the controller 18 permits communication with other network healing smart fiber optic switches 10 or computer systems such that, working in conjunction with other network healing smart fiber optic switches 10 or other devices, network paths may be rerouted to bypass fault conditions and accommodate network loading.

Those skilled in the art will recognize that there are additional alternative embodiments for the network healing smart fiber optic switch 10. For example, in one alternative embodiment, the controller 18 causes the optical switch 16 to switch based on the presence or absence of a particular color or wavelength in the optical signal. In another embodiment, the optical switch 16, in conjunction with other optical switches, is capable of combining the optical signals from two or more input signals to produce a single, composite output signal with the combination occurring based on the condition of the optical signals.

From the forgoing description, it will be recognized by those skilled in the art that a network healing smart fiber optic switch 10 offering advantages over the prior art which has been provided. Specifically, the network healing smart fiber optic switch 10 is a fast, automatic switch that permits switching between multiple paths of an optical transmission line with minimal disruption. Also, the network healing smart fiber optic switch 10 is capable of communicating with other computers and controllers, permitting the network healing smart fiber optic switch 10 to be remotely controlled.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A network healing smart fiber optic switch for fast, automatic switching between a plurality of paths comprising an optical transmission line, each of the plurality of paths comprising a fiber optic cable, said network healing smart fiber optic switch comprising:

a plurality of splitters, each of said plurality of splitters having a splitter input from said fiber optic cable and outputting a first splitter output signal and a second splitter output signal;

a controller responsive to each said second splitter output signal from said plurality of splitters, said controller outputting a controller output signal, said controller maintaining said controller output signal for a predetermined period irrespective of any change to said second splitter output signal, whereby any tendency towards oscillation of said control output signal is minimized; and an optical switch responsive to said controller output signal, said optical switch capable of switching any of said first splitter output signal to an optical switch output.

2. A network healing smart fiber optic switch for fast, automatic switching between a plurality of paths comprising an optical transmission line, each of the plurality of paths comprising a fiber optic cable, said network healing smart fiber optic switch comprising:

a means for splitting a plurality of input signals, each of said plurality of input signals split into a first splitter output signal and a second splitter output signal;

a means for controlling responsive to each of said second splitter output signal and having a controller output signal;

a means for maintaining said controller output signal for a predetermined period irrespective of any change to said second splitter output signal, whereby any tendency towards oscillation of said control output signal is minimized; and a means for switching any of said first splitter output signals to an optical switch output, said means for switching responsive to said controller output.

3. A method of switching a fiber optic network using a network healing smart fiber optic switch, which switches between a plurality of paths of an optical transmission line, each of the plurality of paths comprising a fiber optic cable, said network healing smart fiber optic switch includes a plurality of splitters, a controller, and an optical switch, said method comprising the steps of:

splitting a plurality of input signals into a plurality of first splitter output signals and a plurality of second splitter output signals, one of each said plurality of first splitter output signals and one of each said plurality of second splitter output signals for each one of said plurality of input signals;

controlling said network healing smart fiber optic switch by sensing said plurality of second splitter output signals and outputting a control output signal;

maintaining said control output signal for a predetermined period irrespective of any change to said second splitter output signal, whereby any tendency towards oscillation of said control output signal is minimized; and switching any of said plurality of first splitter output signals to an optical switch output in accordance with said control output signal.

* * * * *